US006194106B1

(12) United States Patent
Bretscher et al.

(10) Patent No.: US 6,194,106 B1
(45) Date of Patent: Feb. 27, 2001

(54) TEMPORARY IMAGE RECEPTOR AND MEANS FOR CHEMICAL MODIFICATION OF RELEASE SURFACES ON A TEMPORARY IMAGE RECEPTOR

(75) Inventors: Kathryn R. Bretscher; Terri L. Butler, both of Minneapolis; Mark C. Berens, Oakdale, all of MN (US); James A. Baker, Hudson, WI (US); Gay L. Herman, Cottage Grove, MN (US); Larry D. Boardman, Woodbury, MN (US); Gaye K. Lehman, Lauderdale, MN (US)

(73) Assignee: Minnesota Mining and Manufacturing Company, St. Paul, MN (US)

( * ) Notice: Subject to any disclaimer, the term of this patent is extended or adjusted under 35 U.S.C. 154(b) by 0 days.

(21) Appl. No.: 09/575,941

(22) Filed: May 23, 2000

Related U.S. Application Data

(62) Division of application No. 09/451,060, filed on Nov. 30, 1999, now Pat. No. 6,106,989.

(51) Int. Cl.[7] .............................. D06N 7/04; B32B 9/04; G03C 3/00

(52) U.S. Cl. ............................ 430/18; 428/141; 428/447

(58) Field of Search .............................. 430/18; 428/141, 428/447

(56) References Cited

U.S. PATENT DOCUMENTS

| | | | |
|---|---|---|---|
| Re. 31,727 | 11/1984 | Eckberg | 428/429 |
| 3,159,662 | 12/1964 | Ashby | 528/15 |
| 3,220,972 | 11/1965 | Lamoreaux | 528/15 |
| 3,410,886 | 11/1968 | Joy | 556/479 |
| 3,559,570 | 2/1971 | Martel et al. | 101/401.1 |
| 3,801,315 | 4/1974 | Gundlach et al. | 430/49 |
| 3,948,657 | 4/1976 | Yoshikawa et al. | 430/132 |
| 4,439,509 | 3/1984 | Schank | 430/132 |
| 4,477,548 | 10/1984 | Harasta et al. | 430/132 |
| 4,510,094 | 4/1985 | Drahnak | 244/130 |
| 4,537,849 | 8/1985 | Arai | 430/85 |
| 4,565,760 | 1/1986 | Schank | 430/66 |
| 4,595,602 | 6/1986 | Schank | 430/67 |
| 4,600,484 | 7/1986 | Drahnak | 204/157.74 |
| 4,600,673 | 7/1986 | Hendrickson et al. | 430/66 |
| 4,606,934 | 8/1986 | Lee et al. | 430/67 |
| 4,609,574 | 9/1986 | Keryk et al. | 427/407.1 |
| 4,774,111 | 9/1988 | Lo | 427/387 |
| 4,904,557 | 2/1990 | Kubo | 430/56 |
| 4,923,775 | 5/1990 | Schank | 430/66 |
| 4,957,839 | 9/1990 | Rokutanzono et al. | 430/67 |
| 4,962,008 | 10/1990 | Kimura et al. | 430/67 |
| 4,997,738 | 3/1991 | Kumakura et al. | 430/67 |
| 5,036,117 | 7/1991 | Chung et al. | 522/172 |
| 5,045,391 | 9/1991 | Brandt et al. | 428/336 |
| 5,087,540 | 2/1992 | Murakami et al. | 430/78 |
| 5,114,520 | 5/1992 | Wang, Jr. et al. | 430/126 |
| 5,212,048 | 5/1993 | Lewis et al. | 430/272 |
| 5,213,928 | 5/1993 | Yu | 430/66 |
| 5,262,259 | 11/1993 | Chou et al. | 430/47 |
| 5,264,291 | 11/1993 | Shinozaki | 428/513 |

(List continued on next page.)

FOREIGN PATENT DOCUMENTS

| | | |
|---|---|---|
| 0300426 A2 | 7/1987 | (EP) . |
| 0444870 A2 | 9/1991 | (EP) . |
| 0559575 A1 | 9/1993 | (EP) . |
| WO 85/00901 | 2/1985 | (WO) . |
| WO 96/23595 | 8/1996 | (WO) . |
| WO 96/34318 | 10/1996 | (WO) . |
| WO 96/35458 | 11/1996 | (WO) . |

OTHER PUBLICATIONS

Diamond, A., "Handbook of Imaging Materials," Marcel Dekker, Inc., pp. 379–446 (1991).

Shaw, D., "Introduction to Colloid and Surface Chemistry," Butterworth Heinemann, 4$^{th}$ Edition, pp. 72–75.

Schaffert, R.M., "Electrophotography," John Wiley & Sons, pp. 260–396 (1975).

Smith, A.L., "The Analytical Chemistry of Silicones," John Wiley & Sons, Inc., pp. 135, 158–161 (1991).

ASTM Test Method D 2197–86, "Standard Test Method for Adhesion of Organic Coatings by Schrape Adhesion," pp. 205–206 (1991).

ASTM Test Method D 1894–95, "Standard Test Method for Static and Kinetic Coefficients of Friction of Plastic Film and Sheeting," pp. 427–432 (1997).

Encyclopedia of Polymer Science and Engineering, vol. 15, 1989, pp. 265–270.

R. N. Wenzel, *Industrial and Engineering Chemistry*, "Resistance of Solid Surfaces to Wetting by Water," vol. 28, No. 8, pp. 988–994 (1936).

S. J. Clarson and J. A. Semlyen, eds., Siloxane Polymers, Prentice Hall 1993, pp. 512–543 and 637–641.

I. Yilgor and J.E. McGrath, *Adv. Polymer Science,* Polysiloxane Containing Copolymers: A Survey of Recent Developments, vol. 86, 1989.

E. Cohen and E. Gutoff, *Modern Coating and Drying Technology,* (VCH Press: NY, 1992), pp. 79–94 & pp. 131–133.

R. H. Dettre and R. E. Johnson, Jr., *Contact Angle, Wettability, and Adhesion,* "Contact Angle Hysteresis" Advances in Chemistry Series, 43, F.M. Fowkes, Ed., ACS Washington, DC 1964.

*Primary Examiner*—Roland Martin

(57) ABSTRACT

This invention discloses novel surface release layers on temporary image receptors particularly suited to the requirements of liquid electrographic (both electrophotographic and electrostatic) printing on a variety of receptors. The inventive temporary image receptors are comprised of a surface release layer on a photoreceptive or dielectric substrate. The release layers are silicone copolymers which are chemically modified to improve imaging, drying or transfer performance when used in the simplified color electrophotography (SCE) or electrostatic printing processes.

7 Claims, No Drawings

U.S. PATENT DOCUMENTS

| | | | |
|---|---|---|---|
| 5,320,923 | 6/1994 | Nguyen | 430/78 |
| 5,363,179 | 11/1994 | Cahill et al. | 430/126 |
| 5,397,634 | 3/1995 | Cahill et al. | 428/304.4 |
| 5,400,126 | 3/1995 | Cahill et al. | 430/126 |
| 5,414,502 | 5/1995 | Cahill et al. | 430/124 |
| 5,468,815 | 11/1995 | Boardman et al. | 525/478 |
| 5,475,480 | 12/1995 | Cahill et al. | 430/126 |
| 5,483,321 | 1/1996 | Cahill et al | 156/240 |
| 5,488,455 | 1/1996 | Cahill et al. | 430/126 |
| 5,520,978 | 5/1996 | Boardman et al. | 428/41.9 |
| 5,552,869 | 9/1996 | Schilli et al. | 399/251 |
| 5,650,253 | 7/1997 | Baker et al. | 430/119 |
| 5,652,078 | 7/1997 | Jalbert et al. | 430/66 |
| 5,652,282 | 7/1997 | Baker et al. | 523/201 |
| 5,733,698 | 3/1998 | Lehman et al. | 430/66 |
| 5,916,718 | 6/1999 | Kellie et al. | 430/45 |

TEMPORARY IMAGE RECEPTOR AND MEANS FOR CHEMICAL MODIFICATION OF RELEASE SURFACES ON A TEMPORARY IMAGE RECEPTOR

RELATED APPLICATIONS

The present application is a divisional of U.S. Ser. No. 09/451,060, filed Nov. 30, 1999, now U.S. Pat. No. 6,106, 989.

This application is related to U.S. Pat. No. 5,733,698 by virtue of common assignee, similar subject matter, and some common inventors. This application is also related to copending, concurrently filed, U.S. patent application Ser. Nos. 08/833,111, 08/832,834, now U.S. Pat. No. 6,020,098, and U.S. Pat. No. 5,928,726, by virtue of common assignee, similar subject matter, and some common inventors.

FIELD OF INVENTION

The present invention relates to temporary image receptors for printing processes using liquid toner, and particularly electrostatic, electrophotographic, and ionographic imaging processes.

BACKGROUND OF INVENTION

Numerous temporary image receptors are known in the art of printing. For example, in offset printing intermediate transfer blankets are used to temporarily store a printed liquid toner image prior to transferring that image to a final receptor. Temporary image receptors are also used for electrographic imaging, which is known in the art to include electrophotographic, electrostatic and ionographic printing.

1) Electrophotography:

Electrophotography forms the technical basis for various well known processes, including photocopying and some forms of laser printing. The basic electrophotographic process involves placing a uniform electrostatic charge on a photoconductive element (also referred to as a photoconductor element or a photoreceptor), imagewise exposing the photoconductive element to activating electromagnetic radiation, also referred to herein as "light", thereby dissipating the charge in the exposed areas, developing the resulting electrostatic latent image with a toner, and transferring the toner image from the photoconductor element to a final substrate, such as paper, either by direct transfer or via an intermediate transfer material. Liquid toners are often preferable because they are capable of giving higher resolution images.

In electrophotographic printing, particularly liquid electrophotographiic printing, the temporary receptor is a photoreceptor. The structure of a photoreceptive element may be a continuous belt, which is supported and circulated by rollers, or a rotatable drum. All pliotoreceptors have a photoconductive layer which conducts electric current when exposed to activating electromagnetic radiation. The photoconductive layer is generally affixed to an electroconductive support. The surface of the photoreceptor is either negatively or positively charged such that when activating electromagnetic radiation strikes the photoconductive layer, charge is conducted through the photoconductor in that region to nuetralize or reduce the surface potential in the illuminated region Other layers, including surface release layers and interlayers, such as priming layers, charge injection blocking layers, barrier layers may also be used in some photoreceptive elements. These photoreceptors are typically multilayer constructions comprised of an underlying photoconductive layer sensitive to actinic radiation and various top coats which impart barrier and/or release properties to the photoreceptor. See R. M. Schaffert, "Electrophotography" (John Wiley: N.Y., 1975), pp. 260–396.

When multi-colored images are desired, one may apply each toner color to the photoconductor element and transfer each color image to the final substrate separately. Alternatively, all the colors may be first assembled in registration on the photoconductor element and then transferred to a final receptor, either directly or via an intermediate transfer element. This method is referred to herein as simplified color electrophotography (SCE). See e.g. WO97/12288, (incorporated herein by reference). Specifically, a photoreceptor is movably positioned to pass at least one exposure station and at least one developing station. If there is only one exposure station or one developing station, the photoreceptor will have to move past the stations several times to create a multicolor image on the photoreceptor, e.g. two or more rotations. If there are several exposure and developing stations the image may be created in a single pass of the photoreceptor. To begin creating a multi-color image, any previously accumulated charge is erased from the photoreceptor. The photoreceptor is charged to a predetermined charge level. The photoreceptor is first image-wise exposed to radiation modulated in accordance with the image data for one of a plurality of colors in order to partially discharge the photoreceptor to produce an image-wise distribution of charges on the photoreceptor corresponding to the image data for the one of the plurality of colors. A first color liquid toner is applied to the image-wise distribution of charges on the photoreceptor to form a first color image. The photoreceptor may then optionally be recharged by any known means, e.g. by corona charging, or the application of the first toner liquid may itself recharge the photoreceptor to a second predetermined charge level. The exposure, liquid toner application and optional recharging steps are repeated as necessary for each desired color.

A problem that may arise during electrophotographic imaging is poor transfer from the photoreceptor to the intermediate transfer member. Poor transfer may be manifested by images that are light, speckled, fuzzy, or smeared. These transfer problems may be reduced by the use of a surface release coating on the photoreceptor.

The release layer may be applied over the photoconductive layer or over an interlayer. The release layer should be durable and resistant to abrasion. The release layer should also resist chemical attack or excessive swelling by the toner carrier fluid. The release layer should also not significantly interfere with the charge dissipation characteristics of the photoconductor construction. Other desirable attributes of release surfaces include good adhesion to the underlying interlayer or photoconductor, excellent transparency to actinic radiation (i.e. laser scanning devices), and simple manufacturing processes and low cost.

Surface release layers are commonly low surface energy coatings such as silicones, fluorosilicones or fluoropolymers. Various silicone release layers useful as topcoats on photoreceptive elements are described in PCT Patent Publication No. WO96/34318 as well as U.S. Pat. No. 4,600, 673, U.S. Pat. No. 5,320,923 and copending U.S. Pat. No. 5,733,698, all of which are incorporated herein by reference.

For liquid electrophotographic printing in particular, it may be desirable to avoid beading of toner excess carrier liquid on the surface of the release layer because the beads of carrier liquid can disturb the toner image. Specifically, the presence of the toner carrier liquid on the surface may allow the toned image to continue to flow with adverse effects on image resolution. Moreover, when a multi-color image is formed on the photoreceptor in a single pass without drying between imaging stages, such beading may cause diffraction of the exposing light during imaging resulting in lack of sharp lines or clarity in the final image.

Therefore, release layers which control the liquid on the surface of the photoreceptor are needed. However, the liquid toner should not cause smearing or diffusional broadening (i.e., blooming) of the image. Desirably, the surface release layers permit virtually 100% image transfer from the photoreceptor to an intermediate transfer member, thereby maintaining optimum image quality eliminating or reducing the need to clean the photoreceptor between images.

Color liquid electrophotography, particularly SCE, imposes a number of critical requirements on the release surface of the photoreceptor. The photoreceptor release surface must, in general, provide a low energy surface for transfer of the toner. Moreover, systems that rely on differential adhesive transfer rely on the relationship of the surface energies of the photoreceptor surface, the liquid toner, the toner film, and any rollers that contact the toner surface. See, for example, copending, coassigned U.S. Pat. No. 5,652,282 (Baker et al.) incorporated by reference herein. For some systems, the relative surface energies should be in the following hierarchy from the element with the lowest surface energy to the element with the highest surface energy: drying element, release layer of photoreceptor, intermediate transfer material, toner, final receptor.

Most references related to chemical modifiction of release surfaces for photoreceptors focus on specific combinations of silicones or fluorosilicones coated as thin (<3 micrometers thick) layers from solvent-based formulations. PCT Patent Publication WO 96/34318 discloses a combination of a silicone with a relatively high molecular weight polymer, optionally, a silicone with relatively low functionality, and a crosslinking agent, the ratios of which may be varied in order to modulate or vary release surface properties. These low swelling release surfaces exhibit a bimodal distribution of chain lengths between crosslinks.

Various means are also known in the art for modifying silicone rubbers, for example, by adding particulate fillers to reinforce and thereby increasing the durability and abrasion resistance of the silicone. See *Siloxane Polymers*, S. J. Carlson and J. A. Semlyen, eds. (PTR Prenticer Hall: N.J., 1993), pp. 512–543 and 637–641. In addition, U.S. Pat. No. 5,212,048 discloses two-component dual cured (addition and condensation cured) silicone coating formulations containing various conductive fillers (e.g. ZnO, $Fe_3O_4$ and $SnO_2$) used to enhance conductivity in non-contact spark discharge imaging of planographic printing plates.

Art related to modification of release surfaces on temporary image receptors by incorporating fillers is described in the U.S. Pat. No. 5,733,698 (Lehman et al), wherein swellable release layer compositions, including compositions based upon high molecular weight hydroxy-terminated siloxanes are generally disclosed. The disclosed release layers are preferably swellable polymeric materials exhibiting swelling behavior in the toner carrier liquid of greater than 40% by weight of the polymer and more preferably greater than 60% by weight.

The same Lehman et al. application also discloses photoreceptor release surfaces in which the surface is roughened to prevent beading of the carrier liquid on the surface. Lehman et al. teach through their examples that the surface roughness (Ra) should be greater than about 10 nm to avoid beading of the carrier liquid. The degree of roughness of the release layer must not be so high as to disturb print quality and should be less than 500 nm, more preferably less than 100 nm, most preferably less than 50 nm. Lehman et al. further disclose that there are various means for obtaining a roughened release surface on a photoreceptive element, including addition of particulates to the release surface. Lehman et al. teach that low surface energy fillers are preferred.

2) Electrostatic Imaging

While the foregoing discussion has focused on the problems associated with surface release layers on photoreceptors in liquid electrophotographic imaging, additional deficiencies with temporary imaging receptors used in other liquid toner imaging processes, particularly liquid electrostatic printing, are known to exist. In electrostatic printing, an electrostatic image is formed by (1) placing a charge onto the surface of a dielectric element (either a temporary image receptor or the final receiving substrate) in selected areas of the element with an electrostatic writing stylus or its equivalent to form a charged image, (2) applying toner to the charged image, (3) drying or fixing the toned image on the dielectric, and optionally (4) transferring the fixed toned image from the temporary image receptor to a permanent receptor. The surface release layer can be transferred with the fixed toned image to the final receptor or can remain on the temporary image receptor after the image transfer to the final receptor. An example of a liquid electrostatic imaging process which makes use of all four steps is described in U.S. Pat. No. 5,262,259. Suitable surface release layers useful in such electrostatic imaging processes are described in European Patent Application 444,870 A2 and U.S. Pat. Nos. 5,045,391 and 5,264,291.

The surface of the dielectric element is typically chosen to be a release layer such as silicone, fluorosilicone or fluorosilicone copolymer. The release layer should be durable and resistant to abrasion. The release layer should also resist chemical attack or excessive swelling by the toner carrier fluid. The release layer should also not significantly interfere with the charge dissipation characteristics of the dielectric construction. It will be understood by those skilled in the art that other properties could be important to durable release performance in liquid electrostatic printing other than those described herein.

One common problem that arises during electrostatic imaging is the phenomenon of carrier liquid beading on the temporary image receptor. Since electrostatic imaging processes typically make use of non-optical means (e.g. an electrostatic stylus or an array of styli) to generate the latent electrostatic image on the surface release layer of the dielectric element, such carrier liquid beading does not generally cause problems of image degradation in multicolor imaging processes due to diffraction of an exposing radiation source as may occur in liquid electropilotographic imaging. However, carrier liquid beading can still degrade image quality by causing the wet toned image to diffusionally broaden or flow, with adverse effects on image resolution. Such image degradation is commonly referred to in tile art as "bleeding" of the image.

Another problem which arises in multicolor liquid electrostatic imaging relates to removal of a portion of one color toner layer during the application of a second color toner layer due to contact of the first, still wet toner layer with the electrostatic styli. This phenomenon is commonly referred to in the art as "head scraping."

Yet another problem which arises in multicolor liquid electrostatic printing processes, particularly as described in U.S. Pat. No. 5,262,259, relates to the final transfer step of the fixed toned image from the temporary image receptor to a permanent receptor. This transfer process is commonly carried out using heat and/or pressure. This transfer process is inherently slow, and its speed is limited by the rate at which heat can be transferred through the temporary image receptor and by the upper limit of pressure which can be applied during the transfer step. If the applied heat and/or pressure are not correctly selected, or the transfer speed is too high, poor image transfer can result. Poor image transfer may be manifested by incompletely transferred images or images that are light and/or speckled.

Therefore, there is a need for release layers which control the liquid on the surface of the dielectric receptor and minimize the beading effect. There is also a need for surface release layers which permit virtually 100% image transfer from the temporary image receptor (e.g. dielectric element) to a permanent receptor. There is also a need for surface release layers which permit image transfer from the temporary image receptor to the permanent receptor at higher transfer speeds and at lower temperatures and/or pressures.

3) Additional Information

Art related to chemical modification of release properties is primarily related to the preparation of low adhesion backsides (LAB's) for use in preparing pressure sensitive adhesive tapes or films. Low viscosity addition-cured vinyl silicones are disclosed in U.S. Pat. No. RE. 31,727. The use of etliylenically unsaturated silicone monomers or prepolymers in combination with alkenyl functional silicone gums to obtain low coefficient of friction silicone release are also described in U.S. Pat. No. 5,468,815 and in coassigned European Patent Publication 0 559 575 A1, incorporated by reference herein.

SUMMARY OF INVENTION

This invention discloses novel surface release layers and the use of such surface release layers as temporary image receptors suitable for use in liquid imaging processes. The temporary receptors are particularly suited to liquid electrographic printing (electrostatic, electrophotographic and ionographic).

One aspect of this invention is to provide the solvent resistance, swelling resistance, abrasion resistance and durability of photoreceptor release layers. Another aspect of this invention is to improve the imaging performance of the surface release layers. Still another feature of the present invention is the ability to improve imaging performance by decreasing the coefficient of friction of the surface release layer. Still another feature of the present invention is the ability to enhance image transfer performance. An advantage of the present invention is that virtually any surface release material presently used in the art can be improved by inclusion of the chemical release modifiers: namely, highly branched and/or tightly crosslinked components such as silicate resins condensation products of silane coupling agents, additives that modify the coefficient of friction, silicone gums, and fillers, as used in the present invention with temporary image receptors in electrography.

Another advantage of the present invention is the ability to use the compositions of the present invention on virtually any known photoconductor substrate or dielectric substrate known in the art, either in a reusable or disposable fashion and either in a transfer or retention mode. Another advantage of the present invention is the ability to combine the compositions of the present invention with other techniques for improving release properties, such as a physical modification of the surface release layer as disclosed in copending, coassigned U.S. patent application Ser. No. 08/833,111.

According to one embodiment, this invention is a photoreceptor comprising an electroconductive substrate, a photoconductive layer on the electroconductive substrate, and a surface release layer over the photoconductive layer. The surface release layer is multimodal. "Multimodal" as used herein means that the polymeric material comprising the release layer has three or more predominant ranges of chain lengths between crosslinks. "Chain length between crosslinks" indicates how many monomeric units are in the backbone of the polymer between monomeric units from which branching or cross-linking has occurred. For example, for a trimodal system there are three predominant ranges of chain lengths between crosslinks.

The release layer preferably comprises the reaction product of a relatively high functional silicone oligomer, a relatively low functional silicone oligomer, an optional cross-linking agent, and a highly branched component, such as silicate resin The silicate resin improves durability and image performance. These resins also modify the peel force of the release compositions, which serves to improve liquid imaging performance.

In another embodiment of the invention concerning liquid electrostatic imaging, the temporary receptor is comprised of the release layer coated onto a dielectric substrate such as paper, as described in U.S. Pat. Nos. 5,045,391 and 5,262,259, which are incorporated herein by reference.

Yet another embodiment of the invention is the use of low viscosity release formulations for solventless coating onto a photo photoreceptive element or electrostatic element. According to this embodiment, the invention is a method for making a temporary image receptor comprising the steps of:

- providing a substrate;
- providing a silicon or fluorine containing prepolymer having a number average molecular weight from 500–30,000 Da; a crosslinking agent; and, optionally, a silicon or fluorine containing polymer having a molecular weight in the range from 30,000 to 500,000 Da, to form a solventless release coating composition;
- coating the solventless release coating composition onto the substrate; and
- curing the solventless release coating composition.

Molecular weight as used herein refers to number average molecular weight unless explicitly stated to the contrary.

Still another embodiment of the invention is the use of chemical modifiers in combination with low surface energy fillers in silicone release surfaces as a means to improve the durability and imaging performance of a temporary image receptor.

For electrostatic imaging substrates, the release layer can either transfer with the image to the final receptor or remain with the temporary image receptor for additional use or disposal. The function of the release layer in a transfer to the final receptor can become a protective layer, such as disclosed in U.S. Pat. No. 5,397,634 and as is used in Scotchprint™ brand No. 8603 Electrostatic Imaging Media commercially available from Minnesota Mining and Manufacturing Company of St. Paul, Minn.

Further features and advantages of the invention are described in the following Embodiments and Examples.

EMBODIMENTS OF THE INVENTION

Substrates

This invention comprises a temporary image receptor comprised of at least a surface release layer and a substrate. Any conventional substrate is a suitable candidate for use in the present invention with the surface release layer. Non-limiting examples of substrates include a metal drum, metal-coated web, belt, sheet, paper, or other material found useful in liquid printing processes.

Electrophotogranhic Printing Substrates

The photoreceptors of this invention comprise an electroconductive substrate, a photoconductive layer, optional interlayers, such as barrier layers, priming layers, and charge blocking layers, and a release layer. The photoreceptor may be of any known structure but is preferably a belt or a drum.

Electroconductive substrates for photoconductive systems are well known in the art and are generally of two general classes: (a) self-supporting layers or blocks of conducting metals, or other highly conducting materials; (b) insulating materials such as polymer sheets, glass, or paper, to which a thin conductive coating, e.g. vapor coated aluminum, has been applied.

The photoconductive layer can be any type known in the art, including (a) an inorganic photoconductor material in particulate form dispersed in a binder or, more preferably, (b) an organic photoconductor material. The thickness of the photoconductor is dependent on the material used, but is typically in the range of 5 to 150 μm.

Photoconductor elements having organic photoconductor material are discussed in Borsenberger and Weiss, "Photoreceptors: Organic Photoconductors", Ch. 9 *Handbook of Imaging Materials*, ed, Arthur S. Diamond, Marcel Dekker, Inc. 1991. When an organic photoconductor material is used, the photoconductive layer can be a bilayer construction consisting of a charge generating layer and a charge transport layer. The charge generating layer is typically about 0.01 to 20 μm thick and includes a material, such as a dyestuff or pigment, which is capable of absorbing light to generate charge carriers. The charge transport layer is typically 10–20 μm thick and includes a material, such as poly-N-vinylcarbazoles or derivatives of bis (benzocarbazole)-phenylmethane in a suitable binder. The material must be capable of transferring the generated charge carriers.

In standard use of bilayer organic photoconductor materials in photoconductor elements, the charge generation layer is located between the conductive substrate and the charge transport layer. Such a photoconductor element is usually formed by coating the conductive substrate with a thin coating of a charge generation layer, overcoated by a relatively thick coating of a charge transport layer. During operation, the surface of the photoconductor element is negatively charged. Upon imaging, in the light-struck areas, hole/electron pairs are formed at or near the charge generation layer/charge transport layer interface. Electrons migrate through the charge generation layer to the conductive substrate while holes migrate through the charge transport layer to neutralize the negative charge on the surface. In this way, charge is neutralized in the light-struck areas.

Alternatively, an inverted bilayer system may be used. Photoconductor elements having an inverted bilayer organic photoconductor material require positive charging which results in less deterioration of the photoreceptor surface. In a typical inverted bilayer system, the conductive substrate is coated with a relatively thick coating (about 5 to 20 μm) of a charge transport layer, overcoated with a relatively thin (0.05 to 1.0 μm) coating of a charge generation layer. During operation, the surface of the photoreceptor is typically positively charged. Upon imaging, in the light-stick areas, hole/electron pairs are formed at or near the charge generation layer/charge transport layer interface. Electrons migrate through the charge generation layer to neutralize the positive charge on the surface while holes migrate through the charge transport layer to the conductive substrate. In this way, charge is again neutralized in the light-struck areas.

As yet another alternative, all organic photoconductive layer can comprise a single-layer construction containing a mixture of charge generation and charge transport materials and having both charge generating and charge transport capabilities. Examples of single-layer organic photoconductive layers are described in U.S. Pat. Nos. 5,087,540 and 3,816,118, incorporated by reference herein.

Suitable charge generating materials for use in a single layer photoreceptor and/or the charge generating layer of a dual layer photoreceptor include azo pigments, perylene pigments, phthalocyanine pigments, squaraine pigments, and two phase aggregate materials. The two phase aggregate materials contain a light sensitive filamentary crystalline phase dispersed in an amorphous matrix.

The charge transport material transports the charge (holes or electrons) from the site of generation through the bulk of the film. Charge transport materials are typically either molecularly doped polymers or active transport polymers. Suitable charge transport materials include enanmines, hydrazones, oxadiazoles, oxazoles, pyrazolines, triaryl amnines, and triaryl methanes. A suitable active transport polymer is polyvinyl carbazole. Especially preferred transport materials are polymers such as poly(N-vinyl carbazole) and acceptor doped poly(N-vinylcarbazole). Additional materials are disclosed in Borsenberger and Weiss, "Photoreceptors: Organic Photoconductors", Ch. 9 *Handbook of Imaging Materials*, ed. Arthur S. Diamond, Marcel Dekker, Inc. 1991.

Suitable binder resins for the organic photoconductor materials include, but are not limited to, polyesters, polyvinyl acetate, polyvinyl chloride, polyvinylidelic chloride, polycarbonates, polyvinyl butyral, polyvinyl acetoacetal, polyvinyl formal, polyacrylonitrile, polyacrylates such as polymethyl methacrylate, polyvinyl carbazoles, copolymers of monomers used in the above-mentioned polymers, vinyl chloride/vinyl acetate/vinyl alcohol terpolymers, vinyl chloride/vinyl acetate/maleic acid terpolymers, ethylene/vinyl acetate copolymers, vinyl chloride/vinylidene chloride copolymers, cellulose polymers and mixtures thereof. Suitable solvents used in coating the organic photoconductor materials include, for example, nitrobenizene, chlorobenzetie, dichlorobenzene, trichloroethylene, tetrahydrofuran, and the like.

Inorganic photoconductors such as, for example, zinc oxide, titanium dioxide, cadmium sulfide, and antimony sulfide, dispersed in an insulating binder are well known in the art and may be used in any of their conventional versions with the addition of sensitizing dyes where required. The preferred hinders are resinous materials, including, but not limit to, styrenebutadiene copolymers, modified acrylic polymers, vinyl acetate polymers, styrene-alkyd resins, soya-alkyl resins, polyvinylchloride, polyvinylidene chloride, acrylonitrile, polycarbonate, polyacrylic and methacrylic esters, polystyrene, polyesters, and combinations thereof. Inorganic photoconductors such as selenium, selenium/tellurium, and arsenic triselenide are also well known in the art.

The photoconductor element of this invention may further comprise an interlayer between the photoconductor layer and the release layer. The interlayer or interlayers can serve a variety of purposes such as improving the adhesion of the release layer to the photoconductor layer, protecting the photoconductor layer from the toner carrier liquid and other compounds which might damage the photoconductor, and protecting the photoconductive layer from damage that could occur from charging the photoconductor element with a voltage corona. Examples of such interlayers include charge blocking layers, primer layers, and barrier layers. The interlayer, like the release layer, must not significantly interfere with the charge dissipation characteristics of the photoconductor element and must adhere well to the photoconductive layer and the release layer, preferably without tile need for adhesives.

The interlayer may be any known interlayer, such as a crosslinkable siloxanol-colloidal silica hybrid as disclosed in U.S. Pat. Nos. 4,439,509; 4,606,934; 4,595,602; and 4,923,775 (the disclosures of which are incorporated by reference); a coating formed from a dispersion of hydroxylated silsesquioxane and colloidal silica in an alcohol medium as disclosed by U.S. Pat. No. 4,565,760; or a polymer resulting from a mixture of polyvinyl alcohol with methylvinylether/maleic anhydride copolymer. Preferably, the interlayer is a composite which includes silica and an organic polymer selected from the group consisting of polyacrylates, polyurethanes, polyvinyl acetals, sulfonated polyesters, and mixtures of polyvinyl alcohol with methylvinylether/maleic anhydride copolymer. The organic polymer and silica are preferably present in the interlayer at a silica to polymer weight ratio ranging from 9:1 to about 1:1. Interlayers of this type are disclosed in copending U.S. application Ser. No. 08/091,999 filed Jul. 15, 1993 (corresponding to EPO Publication 0 719 426).

Another preferred interlayer is a composite material of an organic polymer with a silanol. The silanol has the formula $$Y_aSi(OH)_b$$

wherein:

Y includes, for example, alkyl or alkoxy groups having from 1 to 6 carbon atoms; alkoxyalkyl groups in which the alkoxy portion contains from 1 to 2 carbon atoms and the alkyl portion contains from 1 to 6 carbon atoms; halogenated alkyl groups having from 1 to 6 carbon atoms and from 1 to 2 halogen substituents, aminoalkyl groups having from 1 to 6 carbon atoms and one amino group attached to either the 2, 3, 4, 5 or 6 carbon atom; a vinyl group; a phenyl group which may contain 1 to 2 halogen substituents; a cycloalkyl group having from 5 to 6 carbon atoms and which may contain 1 to 2 substituents; and hydrogen, a is a number ranging from 0–2, b is a number ranging from 2–4, and a plus b equals 4.

The organic polymer is preferably selected from the group consisting of polyacrylates, polyurethanes, polyvinyl acetals, sulfonated polyesters, and mixtures of polyvinyl alcohol with methylvinylether/maleic anhydride copolymer.

Electrostatic Printing Substrates

When the substrate is intended for electrostatic printing, a nonconductive substrate, such as a dielectric paper or film, is preferred. A variety of commercially available and publicly disclosed electrostatic substrates are suitable for use in the present invention. Nonlimiting examples of commercially available electrostatic substrates are Scotchprint™ branded electronic graphic systems media commercially available from Minnesota Mining and Manufacturing Company including Nos. 8601, 8603, and 8610. Further, such dielectric media are disclosed in U.S. Pat. Nos. 5,262,259; 5,045,391; 5,397,634; 5,363,179; 5,400,126; 5,414,502; 5,475,480; 5,483,321; 5,488,455 and 5,264,291 (Shinosaki); and in European Patent Publication 0 444 870 A2.

Surface Release Layers

Chemical Composition of Surface Release Layer

While this invention principally identifies chemical modification of a release surface without regard to physical modifications of that surface, nothing in this invention should be construed to limit the use of these chemical formulations in conjunction with physical modifications.

The release materials useful in the release layer can include crosslinkable silicone or fluorosilicone polymers (such as ethylenically unsaturated-, hydroxy-, epoxy-terminated or pendant functional silicone materials); or other release polymers with suitable low surface energy (such as poly(organosiloxanes), condensation cure silicones, and the like).

For a solventless process, the base material should be provided in the form of pre-polymers such that the viscosity is manageable. The pre-polymers (i.e., base materials) can be used alone or in combination with crosslinkers. Optionally, a higher molecular weight, lower functionality polymeric component (second component also sometimes referred to as a gum) and/or highly branched components (third component), such as silicate resins may be added. For solventless systems the addition of silicate resins and high molecular weight components may be desirable so long as the viscosity remains manageable. Particulate fillers may also be added.

Specifically, for solventless coating, the molecular weight of the pre-polymer should be in the range of approximately 500–60,000 Da, preferably 1000–25,000 Da, more preferably 10,000–20,000 Da. ihe higher molecular weight polymeric component preferably is also a fluorine or silicon containing polymer and preferably has a molecular weight less than 800,000, more preferably less than 600,000, and most preferably less than 500,000. Nonlimiting examples of high molecular weight components include a vinyl silicones ranging in molecular weights from about 60,000 to 500,000 available from Gelest (DMS-41, DMS-46, DMS-52 Tulleytown, Pa.) and ethylenically unsaturated organopolysiloxanes as described in U.S. Pat. Nos. 5,468,815 and 5,520,978 and in European Patent Publication 0 559 575 A1 (the disclosures of which are incorporated by reference herein). Preferably, alkenyl-functional silicones having from about 2 to about 10 carbon atoms are used.

For a multimodal release layer, the release layer preferably comprises the reaction product of 35 to 80 parts by weight of a base material having the formula $(R_3SiO_{1/2})_2(R_2SiO_{2/2})_x$, wherein each R is independently selected from alkyl groups, aryl groups, and functional groups capable of crosslinking, and at least 3% of R are functional groups capable of crosslinking, and x is an integer greater than 0;

more than 0 up to 50 parts by weight of a second material having the formula $(R'_3SiO_{1/2})_2(R'_2SiO_{2/2})_y$, wherein each R' is independently selected from alkyl groups, aryl groups, and functional groups capable of crosslinking, and no more than 2.5% of R' are functional groups capable of crosslinking, and y is an integer of at least 50;

more than 0 up to 160 parts by weight of a third material having the formula $(R''_3SiO_{1/2})_a(R''_2SiO_{2/2})_c(R''_nSiO_{(4-n)/2})_b$ wherein a, b, and c are integers, a is 3 or greater, b is 5 or greater, c is 0 or greater and $0.25<b/(a+b+c)<0.9$; n=0 or 1; and each R" is independently selected from alkyl groups, aryl groups, and functional groups capable of crosslinking; and optionally, 5 to 30 parts by weight of a crosslinking agent having the formula $(R'''_3SiO_{1/2})_2X(R'''_2SiO_{2/2})_z$, wherein z is an integer from 0 to 100; X is a single bond, O or a divalent organic linking group, each R''' is independently selected from alkyl groups, aryl groups, and functional groups capable of crosslinking and 25–100% of R''' are functional groups capable of crosslinking provided that there are at least 2 functional groups capable of crosslinking per molecule.

The third component is a highly branched material, such as a silicate resin. See, e.g. Encyclopedia Of Polymer Science And Engineering, VOL. 15, 1989, pp. 265–270, and WO96/35458, incorporated herein by reference, for discussion regarding silicate resins. Nonlimiting commercially available examples of silicate resins include Syl-off™ 7615 (Dow Corning, Midland, Mich.), Gelest vinyl Q resin VQM-135 and VQM-146 (Gelest, Tullytown, Pa.).

If fillers are to be added to the chemical composition, nonlimiting examples of fillers include hydrophobic fumed silica such as CAB-O-SIL™ TS530 and TS720 (both from Cabot Corp. of Billerica, Mass.) and AEROSIL™ R972 (from Degussa Corp, Ridgefield, N.J.). A non-limiting list of low surface energy fillers includes polymethylmethacrylate beads, polystyrene beads, silicone rubber particles, teflon particles, and acrylic particles. Other particulate fillers which can be used but which are higher surface energy include but are not limited to silica (not hydrophobically modified), titanium dioxide, zinc oxide, iron oxide, alumina, vanadium pentoxide, indium oxide, tin oxide, and antimony doped tin oxide. High surface energy particles that have been treated to lower the surface energy are useful. The prefer organic particles include fumed, precipitated or finely divided silicas. More preferred inorganic particles include colloidal silicas known under the tradenames of CAB-O-SIL™ (available from Cabot) and AEROSIL™ (available from Degussa). Suitable low surface energy inorganic fillers include surface treated colloidal silica fillers such as CAB-O-SIL™ TS-530 and TS-720, Degussa R812, R812S, R972, R202. CAB-O-SIL™ TS-530 is a high purity treated fumed silica which has been treated with hexamethyidisilazane (HMDZ). CAB-O-SIL™ TS-720 treated fumed silica is a high purity silica which has been treated with a dimethyl silicone fluid.

Non-conductive fillers are preferred. When conductive fillers are used, the electrical characteristics of the photoconductive assembly must be considered in order to avoid adverse effects due to lateral conductivity.

The composition of the filler is preferably 0.1 to 20%, more preferably 0.5 to 10% most preferably 1 to 5% w/w based on weight of release layer composition excluding solvents.

Release surfaces prepared by adding hydropliobically modified colloidal fillers (e.g. Cab-O-Sil™ TS530 and TS720) to ethylenically unsaturated release formulations coated solventless or from solvent are useful with an embodiment of all SCE imaging process which does not make use of an image drying roller. Exemplary temporary image receptors have been prepared by adding silica fillers to a variety of release formulations having higher alkenyl (e.g., hexenyl) functional silicones with crosslink densities corresponding to percent swelling in toner carrier liquid ranging from about 10% swelling ("low") to about 40% swelling ("medium") to about 100% swelling ("high").

Curing Catalysts

Both thermal and ultraviolet ("UV") initiated catalysts can be used in the formation of release surfaces of the present invention. Nonlimiting examples of platinum thermal catalysts are Dow Corning (Midland, Mich.) Syl-off™ 4000 and Gelest (Tullytown, Pa.) platinum-divinyltetramethyidisiloxane complex (SIP6830.0 and SIP6831.0).

A nonlimiting example of a platinum UV catalyst is disclosed in U.S. Pat. No. 4,510,094 (Drahnak). Unlike a thermal catalyst, the UV catalyst does not require an additional inhibitor since the complex is effectively inhibited until exposure to UV.

A nonlimiting list of silyl hydride crosslinkers include Dow Corning homopolymers (Syl-Off™ 7048), copolymers (Syl-Off™ 7678) and mixtures (Syl-Off™ 7488). Crosslinker in the amounts preferably corresponding to 1:1 to 10:1 silyl hydride:vinyl ratio can be used in combination with an inhibitor (e.g. fumarate in benzyl alcohol (FBA)) in tile base pre-polymer to achieve good cure and adequate pot life.

Crosslink Density & Distribution of Crosslinks in Chemical Composition

The present invention improves print quality in release layers containing 2% w/w of a high molecular weight, lightly cross-linked alkenyl functional polyorganosiloxane gum relative to higher C.O.F. formulations that lack the gum.

The durability of the release may also depend on crosslinking density. However, print quality may deteriorate on highly crosslinked surface release layers due to beading of liquid toner and diffusional broadening of the image during the film forming process.

Exemplary surface release layers may be prepared from base silicone or fluorosilicone addition cured pre-polymers in combination with homopolymer and/or copolymer hydride crosslinkers. These pre-polymers may be prepared in a range of potential crosslinking density afforded by the presence or absence of pendant crosslinkable groups in addition to crosslinkable terminal groups. The mole percent of crosslinkable groups was preferably 0 to 25 mole % alkenyl, more preferably 1–15 mole % alkenyl and most preferably 4–10 mole % alkenyl. Alkenyl (number of carbons greater than 2 and less than 10) crosslinking groups are preferred. The distribution of crosslinks in the crosslinked polymer may be multimodal.

Thickness

A release layer is a dielectric material and its thickness could affect imaging performance in electrographic imaging processes. Furthermore, the durability of the release will depend on the thickness of the release. The thickness of the release layer is preferably less than 5 microns, more preferably less than 3 microns, and most preferably less than 1.5 micron.

Surface Roughness

While the surface of the release layer may be smooth, Applicants have found that roughness may improve image performance. Preferably, the average roughness, Ra, is in the range from 0 to 500 nm . Roughness may be formed by a variety of methods including, the addition of fillers, abrading, embossing, gravure coating, die coating, flexographic printing, Langmuir-Blodgett bath coating, or carrier fluid coating process (see copending U.S. application Ser. No. 08/833,111.

Surface Energy

The surface energy for release layers should be selected to be appropriate relative to other surfaces in the system. The surface energy of the release is preferably less than 28 dynes/cm, more preferably less than 26 dynes/cm, and most preferably less than 24 dynes/cm.

Coefficient of Friction

As discussed above release formulations can be prepared using alkenyl silicone pre-polymers and high molecular weight organopolysiloxanes. When prepared by solvent-free coating methods, these formulations typically yield densely crosslinked, rubbery, slip-resistant coatings.

The traditional solvent-based release formulations have a much more slippery surface texture, exhibiting typical coefficient of friction ("C.O.F.") of 0.05 compared to values of 0.4 or higher for solvent-free release formulations. The addition of a low weight percent of a high molecular weight gum can potentially be used with the solvent free systems to lower the coefficient of friction while maintaining the high crosslinking density. As disclosed in U.S. Pat, Nos. 5,468,815 and 5,520,987, the effectiveness of the gum in lowering the C.O.F. is a function of the specific functionality and molecular weight of the additive. By using commercially available solvent-free base silicones and/or C.O.F. modifying gums in a photoreceptor release, printing performance of the temporary image receptor may be improved. The preferred concentration of C.O.F. modifying gum is less than 20% (w/w), more preferably less than 10% (w/w) and most preferably less than 5% (w/w).

Methods of Preparation of the Surface Release Layer

Suitable methods of preparing surface release layers on temporary image receptors include various precision coating methods known in the art. A nonlimiting list of such methods includes dip coating, ring coating, die coating, roll coating, gravure coating, bath coating and carrier fluid coating methods as described in co-pending U.S. application Ser. No. 08/832,934 and the like. Either solventless or solvent-based coating formulations may be used.

For solvent-based coating layers, the solvent based coating layers, the solvent must dissolve the release prepolymers and additives yet not attack the underlying photoconducter layers or the dielectric substrate. Suitable solventless release formulations can be prepared using alkenyl silicone prepolymers and high molecular weight crosslinkable gums. These release formulations have been rotogravure coated at thicknesses of 0.1–2 micrometers and produced by fluid carrier liquid coating method (as described in WO 96/23595 and co-pending U.S. application Ser. No. 08/832,934) coated at 0.65 micrometers to yield high quality photoreceptor release surfaces without the pollution associated with art solvent-based formulations.

Surface release coatings are typically thermally cured after coating in order to improve release layer durability and promote adhesion to the underlying substrate which forms the temporary image receptor. In addition to or in place of thermal cure methods, the release formulations may also be cured using electromagnetic radiation such as ultraviolet lamps, excimer lasers, electron beams, etc.

Operational Processes

The temporary image receptors of the present invention may be utilized in a variety of operational imaging processes, including but not limited to liquid electrophotographic printing and liquid electrostatic printing. A requirement of these operational processes is that the the liquid toner image reside only temporarily on the image receptor, and that a subsequent transfer step is used to transfer the image to a final, permanent receptor. In accordance with these requirements, we envision a number of operational modes for the chemically modified release surface.

According to one preferred operation of electrophotography, the operation comprises the steps of:

producing an image-wise distribution of charges on a photoreceptor corresponding to the image data;

applying a liquid toner comprising solid charged pigmented toner particles in a carrier liquid to the photoreceptor forming an image-wise distribution of the toner particles on said photoreceptor to form the image;

transferring the image from the photoreceptor to an intermediate transfer element forming a first transfer nip under pressure with the photoreceptor;

transferring the image from the intermediate transfer element to a receptor media. If an image of more than color is being formed, preferably all the colors are assembled on the photoreceptor in registration prior to transfer to the intermediate transfer element. The assembly of the colors may be done in a single pass or by multiple passes of the photoreceptor. The release layers of this invention have been found to work well with the intermediate transfer element of copending U.S. Application U.S. Pat. No. 5,965,3140, incorporated herein by reference, as well as with the system disclosed in that application wherein no image drying station is used. Of course, a drying means may be used if desired.

For example, the release surface may be substantially adhered to or fixed to the underlying substrate of the temporary image receptor. In such case we refer to a reusable surface release layer, that is, a surface release layer which remains with the temporary image receptor for additional use or disposal as contemplated above. Alternatively, the surface release layer may be substantially non-adhered to the underlying substrate of the temporary image receptor. In such case we refer to a sacrificial surface release layer. The function of a sacrificial release layer in a transfer to the final receptor can become a protective layer, such as disclosed in U.S. Pat. No. 5,397,634 (Cahill) and as is used in Scotchprint™ brand No. 8603 Electrostatic Imaging Media commercially available from Minnesota Mining and Manufacturing Company of St. Paul, Minn.

Usefulness of the Invention

Chemical modification of release surfaces on temporary image receptors provides a means of modulating particular release characteristics (e.g. swelling resistance, carrier liquid beading, scratch resistance, durability, coefficient of friction and roughness) without significant modification of the release surface energy. The total surface energy of the chemically modified release shows less than a 10% change over the untreated release, and more importantly, the polar component of the release surface energy is maintained less than 5 dyne/cm.

The solventless method of forming a release layer enables the release layer to be applied to virtually any substrate because there is no solvent to attack the underlying layers. In addition, the solventless method has the benefits of requiring fewer components, no solvent handling or disposal, and, therefore, potentially lower cost.

Using the chemically modified release layers of the present invention, it is possible to optimize release performance for a particular imaging process without changing the base polymer characteristics. For example, the invention discloses novel release surfaces useful in an liquid electrophotographic process with and without a drying roll.

Also, unexpectedly, it is possible to modify release layer characteristics for optimal image quality without changing the base polymer used in the release layer.

Further embodiments and usefulness are disclosed in the following examples.

EXAMPLES

Materials and Methods

Silicone polymers were obtained commercially or prepared by methods known in the art. Table 1 summarizes silicone pre-polymers used in the examples, which include hexenyl functional organopolysiloxanes prepared according to Keryk et al, U.S. Pat. No. 4,609,574 and Boardman et al. U.S. Pat. No. 5,520,978 and vinyl functional organopolysiloxanes obtained from Gelest (VDT-731; Tullytown, Pa.) or prepared according to methods known in the art, as disclosed in McGrath, J. E. and I. Yilgor, Adv. Polymer Science, Vol. 86, p. 1, 1989; Ashby, U.S. Pat. No. 3,159,662; Lamoreaux, U.S. Pat. No. 3,220,972; Joy, U.S. Pat. No. 3,410,886. The mole percent of crosslinkable groups varied between 1–10% in the pre-polymer. The number average molecular weight of the pre-polymers ranged from approximately 5000–150,000 Da, with the lower molecular weights corresponding to useful viscosity ranges for solventless coating methods. In addition to silicone pre-polymers, high molecular weight silicone gums were used as additives, as described in Table 1. Hexenyl functional silicone gums were prepared according to Boardman et al. U.S. Pat. No. 5,520,978. Vinyl functional silicone gums were obtained commercially from Gelest DMS-V41 and DMS-V52) or prepared according to McGrath, J. E. and I. Yilgor, Adv. Polymer Science, Vol. 86, p. 1, 1989; Ashby, U.S. Pat. No. 3,159,662; Lamoreaux, U.S. Pat. No. 3,220,972; Joy, U.S. Pat. No. 3,410,886. The mole percent of crosslinkable groups was less than 1%, due to the absence of pendant functionality.

Catalysts included Dow Corning platinum thermal catalyst, Syl-Off™ 4000 (Midland, Mich., and an ultraviolet initiated platinum catalyst prepared according to Dranak, U.S. Pat. No. 4,510,094. Homopolymer and/or copolymer hydride crosslinkers such as Dow Corning Syl-Off™ 7048, Syl-Off™ 7678, and Syl-Off™ 7488 and NM203 from United Chemical Technology (Piscataway, N.J.) were used at silyl hydride to vinyl ratios of 1:1 to 5:1. In order to obtain adequate pot life in solventless (i.e., 100% solids) silicone formulations, 2.40% (w/w) of a 70:30 mixture by weight of diethyl fumarate and benzyl alcohol (FBA) was added as an inhibitor or bath life extender as taught in U.S. Pat. Nos 4,774,111 and 5,036,117. No inhibitor was used for solvent coated mixtures due to the low percent solids in the dispersion.

Materials were evaluated for performance in the presence and absence of chemical modifiers. In addition to the silicone gums described in Table 1, particulate fillers and silicate resins were used. Fillers included hydrophobic fumed silica such as Cab-O-Sil™ (Billerica, Mass.) TS720 and hexamethyidisilazane (HMDZ) in-situ treated silica. Silicate resins included Dow Corning 7615 and Gelest vinyl Q resins, VQM-135 and VQM-146. These were obtained as dispersions of silicate in silicone. Dow Corning 7615, for example, is a 50% dispersion of silicate resin in silicone.

TABLE 1

Summary of Material Set

| Component | Description (crosslinking functionality) | mole % alkenyl | Viscosity | Mn (daltons) |
|---|---|---|---|---|
| PRE-POLYMERS | | | | |
| I | hexenyl pendant and terminated | 2.7 | 450 mPas | 9610 |
| II | hexenyl terminated only | 1 | 450 mPas | 12,400 |
| III | hexenyl terminated only | 2 | 450 mPas | 6530 |
| IV | hexenyl pendant and terminated | 3.5 | 450 mPas | 6720 |
| V | hexenyl pendant and terminated | 4 | 450 mPas | 9800 |
| Gelest VDT-731 | vinyl pendant | 7.5 | 1000 mPas | 28,000 |
| VI | vinyl pendant, trimethylsiloxyl terminated | 9.2 | 275,000 mPas | 55,200 |
| VII | vinyl pendant and terminated | 10 | 1000 mPas | |
| VIII | 3% HMDZ silica vinyl pendant and terminated | 10 | 1000 mPas | |
| GUM | | | | |
| IX | hexenyl terminated | 0.033 | | 440,000 |
| X | vinyl pendant | 0.2 | 100 Williams plasticity | |
| XI | vinyl terminated | 0.03 | | 400,000 |
| Gelest DMS-V41 | vinyl terminated | 0.10 | 10,000 | 62,700 |
| Gelest DMS-V52 | vinyl terminated | 0.035 | 165,000 | 155,000 |

Solvent-based Release Formulations

A representative solvent-based release formulation was prepared as follows. A 18 g mixture of silicone pre-polymer, crosslinker and chemical modifier guilt, hydrophobic silica, silicate resin, etc.), was prepared as described in Table 2 and diluted with 221.86 g heptane to form Stock A. Stock B (containing platinum thermal catalyst) was then prepared by mixing 0.41 g of Dow Corning Syl-Off™ 4000 with 6.00 g heptane. A 5.63 g sample of Stock B was then added to Stock A. This sample was extrusion die coated as described below.

Solventless Release Formulations

Release formulations were also prepared at 100% solids. These formulations were precision coated without the use of solvent using gravure coating methods described below.

For the solventless coating formulations, Stock C differed from Stock A above in that it contained the platinum catalyst, a FBA inhibitor, and lacked the crosslinker. A fully reactive system was prepared just prior to coating by the addition of Stock D containing the crosslinker. Examples of these formulations are described in Table 3.

TABLE 2

Example Preparation for Solvent Coating of Release for Temporary Image Receptor

| Components | Final Concentration (relative to base polymer) | Amount (g) |
|---|---|---|
| Stock A | | |
| Silicone pre-polymer V | — | 15.00 |
| Syl-Off ™ 7048 | 5:1 silyl hydride:vinyl | 2.46 |
| Gum IX | 2% w/w | 0.3 |
| Cab-O-Sil ™ TS720 | 1% w/w | 0.15 |
| Heptane | 6.3% solids | 221.86 |
| Stock B | | |
| Syl-Off ™ 4000 | 333 ppm | 0.41 |
| Heptane | — | 6.00 |

TABLE 3

Example Preparation for Solventless Coating of Release Formulations for Temporary Image Receptor

| Components | Final Concentration (relative to base polymer) | Amount (g) |
|---|---|---|
| Stock C | | |
| Silicone pre-polymer V | — | 808.5 |
| Gum IX | 2% w/w | 16.50 |
| Cab-O-Sil ™ TS720 | 1% w/w | 8.25 |
| Syl-Off ™ 4000 | 125 ppm | 19.83 |
| FBA Inhibitor | 2.4% w/w | 19.80 |
| Stock D | | |
| Syl-Off ™ 7048 | 5:1 silyl hydride:vinyl | 135.12 |

Experimental Methods

Coating Methods for Electrophotography

The experimental release layers were coated onto an inverted dual layer photoconductor and interlayer, the formulations of which have been described in Example 2 and Example 4, respectively, of U.S. Pat. No. 5,733,698, (both disclosures of which are incorporated herein by reference), using extrusion die coating or gravure coating methods operated to achieve a desired coating thickness of 0.65–1.3 micrometers.

The solvent-based release compositions were extrusion die coated onto the barrier layer of a photoconductive web (0.102 mm in thickness) and dried in a 3.0 m air flotation dryer. The coating compositions were applied to give a final coating thickness of 0.5 to 1.0 micrometer and cured by exposing the web to 150° C. for 1 minute at a web speed of 3.0 m/min.

Many of the solventless release compositions were gravure coated onto the barrier layer of a photoconductive web (0.102 mm in thickness) and dried in a 3 meter air flotation dryer to give dry coating thicknesses in the range of the 0.65–1.5 micrometers. Gravure rolls with pyramidal cells having volume factors of between 3 and 10 cubic billion micrometers were used in a reverse gravure set-up to coat at roll speed ratios ranging from 0.5 to 2.5. Gravure roll speeds were 1 to 13.6 m/min and web speeds ranged from 2 to 50 m/min. The coating compositions were applied to give a final coating weight of 1.4 to 4 g/m$^2$ and cured for 1 minute at 150° C. using a 3.0 m/min web speed.

Coating thickness was monitored on-line by including an appropriate amount of a UV fluorescent dye in a test formulation such that the signal measured on a UV gauge was proportional to the coating thickness in the region of interest. Gravure coatings were matte finish and showed gravure patterns under 50× magnification, compared to the glossy, smooth solvent based coatings.

Coating Methods for Electrostatic Imaging

Release layers for electostatic imaging were coated onto a 3M Scotchlprint™ Electronic Imaging Paper (8610) using extrusion die coating at 7% solids solution in heptane in the manner described in Table 2 to give release layer thicknesses ranging from 0.3–1.2 microns.

Test Methods

Coating thickness

Coating thicknesses were measured using an Edmunds Hi Mag™ Comparator Gauge. The coated substrate to be measured was first placed under the measurement head and the unit was zeroed. The release coating was subsequently removed using a solvent which dissolves only the release layer. The thickness of the remaining substrate was then measured using the Edmunds Gauge, and the release layer thickness was determined as the difference between thickness readings of the two substrates.

Crosslinking density

The crosslinking density of experimental release coatings was measured using the solvent swelling method as disclosed in O. L. Flaningam and N. R. Langley in *The Analytical Chemistry of Silicones*, E. Lee Smith (ed) (John Wiley and Sons: New York, 1991) p. 159. For solventless formulations, a 2 g sample of silicone formulation prepared according to Table 3 was weighed into a 2 inch (diameter) aluminum pan which had been sprayed with 3M™ Scotchgard™ (Cat. No. 4101). The sample was cured at 150° C. for 30 minutes in an oven and allowed to sit overnight before testing. Samples were also UV cured, as described above. The crosslinking density of solvent base formulations was measured by placing approximately 3 g of a solution of Stock A and B (see Table 2) into a teflon coated aluminum pan. The solvent was allowed to evaporate overnight in a vented hood before the sample was heated at 150° C. for 30 minutes.

The cured sample was allowed to sit overnight before being taken out of the aluminum pan and carefully weighed. It was then submerged in toner carrier liquid (Norpar 12, Exxon Corporation) in a closed glass container overnight, and then reweighed. The percent swelling was expressed as the percent difference in weight of the solvent swollen material relative to the unswollen (initial) material.

Scratch Test for Durability

Durability of the release coating was measured using a Scrape Adhesion Tester, available from BYK Gardner USA (Columbia, Md.), as described in ASTM test method D2197. The instrument consists of a pivoted beam with a 45 degree stylus holder, weight post, and holder for supporting the total test load. On one end of the beam is mounted the stylus; on the other end of the beam is a counterweight. A claim is rotated to lower and raise the stylus. A sample bed mounted on ball bearings is used to move the test panel against the stationary stylus in a direction parallel to the beam. The stylus used in this test was a 1.6 mm chrome plated drill rod, bent to a 180 degree loop with a 6.5 mm OD. By moving a free edge of the test film against this loop under variable load (expressed in grams), the durability of the coating was expressed as the minimum load (g) required to create a continuous scratch in the coating. More durable coatings required higher load values to mar the surface.

Coefficient of Friction

The coefficient of friction was measured according to ASTM method D1894-63, sub-procedure A using a Slip/Peel Tester Model SP-102B-3M90 made by Instruments, Inc. and available from IMASS, Inc.(Hingham, Mass.). A strip of release coated photoreceptor (approximately 6 cm wide) was mounted on a movable platen and an uncovered friction sled, its foam surface in contact with the coating layer, was drawn across the coating at a rate of 15 cm/min for 25 seconds. The coefficient of friction was calculated as the ratio of the tractive (pulling) force to the normal (sled weight) force.

Peel force

Slip/peel tester model SP-102B-3M90 from Instruments, Inc. (Strongsville, Ohio) was used for tape peel force measurements. A 3.2 cm×10 cm sample strip was affixed to the working platen with double stick tape. A 2.5 cm wide strip of 3M™ 202 masking tape was applied to the sample release surface and a 6.8 kg roller was rolled over the tape 6 times. Immediately after adhering the tape, a MB-10 load cell was used to measure the average force (g/cm) required to peel the tape off the surface at 180 degrees and 2.3 m/min for 2 seconds.

In order to predict the change in peel force over extended printing, the Durability Wiper Test was used to abrade samples of the release as described in PCT Patent Publication WO96/34318. The peel force was measured on fresh samples (0 wipes) and wiped samples (2400 and 3600 wipes over a 360 degree are as described in Durability Wiper Test, below).

Durability Wiper Test

A durability wiper test was used to evaluate release surface durability and abrasion resistance in simulated wet cycling using pure toner carrier liquid in place of liquid toner. The toner carrier liquid was selected to be NORPAR 12 (Exxon Corp.). The durability wiper consisted of a 16 cm diameter aluminum drum and 5 stainless steel shoes with concave surfaces having radii to match the drum. The drum was positioned horizontally and attached to a gear and motor which enabled rotation of the drum at a speed of 40 rev/min. The 5 stainless steel shoes rested, by their own weight (about 300 g) concave side down, on the top side curve of the drum. The shoes were held in place so that they did not move with the rotation of the drum, but could move vertically.

Two layers of paper toweling were wrapped around the drum and then soaked in toner carrier liquid. One 3.2 cm×10 cm strip of the photoconducter construction was secured onto the curved surface of each metal shoe so that, when the shoes were in place, the release surface was in contact with the paper toweling. The drum was then rotated at 40 rev/min for 800 revolutions. For samples with more than 800 wiping revolutions, the paper toweling was replaced by fresh NORPAR 12 soaked toweling every 800 revolutions. After wiping, the sample strips were air dried at least overnight before peel tests were carried out.

Surface Energy (Dynamic Contact Angle)

Dynamic contact angles were measured using the Wilhelmy plate method as disclosed in D. J. Shaw, *Introduction to Colloid and Surface Science*, (Butterworths: London, 1992), p 72 on a Kruss (Charlotte, N.C.) K12 process tensiometer controlled by the K121 software package. Samples were prepared by laminating two sheets of release coated photoreceptor with a 3M™ glue stick such that the silicone coating was exposed on each side and no gaps were formed. A punch was then used to precisely cut square samples of dimensions 18.2 mm wide×0.22 mm thick. Each sample was measured using a caliper prior to immersion and the appropriate measurements were entered into the wetted length (actually wetted perimeter) calculation.

In order to calculate tile surface energy of a given experimental release surface, the dynamic contact angles of two probe fluids (NORPAR 12 and water) were measured with respect to the sample. The geometric mean method of Owens and Wendt (D. K. Owens and R. C. Wendt, *Journal of Applied Polymer Science*, 13, pp. 1741–7 (1969)), was then used to calculate the total solid surface energy as well as the polar and dispersion components of this surface energy using Kruss K121 software. The Owens and Wendt method requires measurements of dynamic contact angles using two probe fluids of known surface tension and known polar and dispersion components of the surface tension. At least one of the probe fluids must have a nonzero polar component of the surface tension; this requirement is met by using water as one of the probe fluids. In addition we selected NORPAR 12 carrier liquid as a probe fluid because it is the preferred carrier for liquid toners used in simplified color electrophotography. NORPAR 12, is a blend of non-polar $C_{10}$–$C_{14}$ aliphatic hydrocarbons, and thus provides a probe fluid which exhibits only a dispersion component of surface tension.

Dynamic advancing contact angles were measured using a 4.00 mm/minute search rate and a 3.00 mm/minute measuring rate. The electrobalance sensitivity was 0.005 g. The immersion depth was 3.00 mm with a wait time of 5.0 seconds at the turning point. Two cycles were run on each of two release samples for each probe fluid. The surface energy for the group was therefore based on 4 release coated substrate samples and 8 determinations of dynamic advancing contact angle using two probe fluids. The surface tension values of Strom (measured at 20 C) were used for each test fluid and verified experimentally for each reagent lot using a perfectly wetting platinum Whilhelmy plate to measure liquid surface tension.

Surface Roughness Measurements

Several methods were used to characterize the surface roughness, including interferometry. The data reported here were derived from the WYKO RST-PLUS in VSI mode (WYKO Corporation, Tucson, Ariz.) interferometer at a magnification of 41.4×.

Print Quality Evaluation for Electrophotographic Printing

Print quality was evaluated for each formulation using a 4-pass color printing mechanism described in WO97/12288. The printer was configured with a transfer roll and a drying roll as described in co-pending U.S. application U.S. Pat. No. 5,965,314 and U.S. Pat. No. 5,552,869, respectively. A section of the release coated organic photoreceptor web was adhered to the drum and a dry electrostatic test was run to evaluate the charging and discharging characteristics of the unprinted photoconducter. Monochrome black toner as described in Example 40 of U.S. Pat. No. 5,652,282, (incorporated by reference herein) was then used to develop and transfer images from the photoconductor to consecutive paper sheets.

One print was first made on the printing apparatus with the drying mechanism disengaged to allow for visual inspection of the dewetting (i.e. beading) of the toner carrier fluid on the photoconductor release surface. Toner carrier liquid beading is generally undesirable in multicolor liquid electrophotographic imaging processes since it may result in fluid "lenses" on the photoconducter surface which may interfere with subsequent latent image generation steps that make use of actinic radiation to discharge the photoconducter in areas to be imaged. The printing process was completed with the non-dried, film formed image being transferred from the photoconducter to paper via the intermediate transfer roll. Failure to transfer 100% of the image to the intermediate transfer roll was designated T1 transfer failure. This T1 transfer failure was graded by observing the amount of toner that could be transferred off of the photoconductor to a clean sheet of paper (i.e., the clean up sheet), This process was repeated with a drying roll engaged to evaluate T1 failure in that printing configuration.

To evaluate the release in multiple use applications, a series was run consisting of ten consecutive prints followed by one clean up sheet. This was repeated for each printer configuration. A final electrostatic test was performed after the last clean up sheet. The offset of small sections of dried toner image from the photoconducter to the drying roll (i.e. drying roll picking) was also graded by cleaning the regeneration rolls and inspecting for residual toner. The liquid toner in the developer unit was changed after every three release material evaluations.

All of the release materials were ranked based on print quality of the tenth print made both with and without the drying roll relative to each other and relative to the control sheets. A rating scale of 1 (very good performance) to 5 (very poor performance) was used to grade each of the following nine categories:

1. Beading (visible carrier liquid droplets on the surface of the photoconducter after squeegeeing),
2. Fuzzy text (text characteristics which are indistinctly defined or which are surrounded by a lightly pigmented halo of toner),
3. Fat text (text characters which exhibit broadening of the individual pixels),
4. Solid area pull down (toner smearing in the machine direction due to the developer roll or squeegee),
5. Text area pull down (vertical offset of the text characters),
6. Squeegee offset (partial transfer of the wet image to the squeegee and transfer back to the photoconducter (luring a subsequent revolution of the squeegee),
7. Drying roll picking (partial offset of small sections of the dry toner image from tile photoconductor to the drying roll; applicable only when a drying roll is used),
8. T1 offset (failure of 100% of the film-formed image to transfer to the intermediate transfer roller and transfer of the remaining untransferred image to clean up paper during a subsequent revolution of the intermediate transfer roller),
9. T2 offset (partial toner film transfer from the intermediate transfer roller to paper and transfer of the remaining untransferred image to the paper during a subsequent revolution of the intermediate).

The overall print quality was estimated as the average of these characteristics (which were given equal weighting). In a second evaluation, the print performance was summarized as the average of all characteristics, excluding beading.

Print Quality Evaluation for Electrostatic Imaging

A 3M Scotchprint™ Model 9510 Electrostatic Printer (as described in U.S. Pat. No. 5,262,259) was modified to accommodate a 30 cm wide web, and used to print on release coated temporary image receptors. Standard Scotchprint™ toners were used to image onto coated 3M Scotchprint™ Electronic Imaging Paper (8610). Optical density was compared to a control, which consisted of uncoated Scotchprint™ 8610 imaging paper. Transfer efficiency was rated relative to a control consisting of Scotchprint™ 8601 image transfer media. The images were transferred to Scotchprint™ 8620 receptor media using a 3M Scotchprint™ Model 9540 Laminator with a heated top roll, as described in U.S. Pat. No. 5,114,520. The printer and laminator settings are summarized in Table 4.

TABLE 4

Experimental Parameters for 3M Scotchprint ™ Model 9510 Electrostatic Printer and Model 9540 Laminator

| CONFIGURATION | SETTING |
|---|---|
| Printer | |
| Nib Voltage (V) | 275 |
| Plate settings (V): | |
| black | 255 |
| cyan | 150 |
| yellow | 150 |
| magenta | 255 |
| Laminator | |
| Speed (m/min) | 0.61 and 1.8 |
| Pressure (kPa) | 441 |
| Temperature (degrees C.) | 96 |

Print quality was evaluated for each formulation. Images produced on the 3M Scotchprint™ Modified Model 9510 Electrostatic Printer were examined for evidence of head scraping, resulting from toner delamination from the release surface and potentially leading to shorting between printing nibs. None of the materials exhibited head scraping.

Transfer was graded by a visual standard method rating system (VSM). The VSM graded the effectiveness of image transfer by a visual inspection of the residual toner left on the transfer medium after transfer and by inspection of the receptor medium for transfer image quality, uniformity of color and presence of defects. Transfer was rated on a scale of 4.0–10.0, with 10.0 representing perfect transfer. A minimum rating of 8.5 was required for acceptable transfer. Transfer efficiency is a function of laminator speed, with 0.46 meters per minute used for standard product transfer. For the purpose of these tests, higher laminator speeds of 0.61 and 1.8 meters per minute were used. Image transfer performance was rated against a 3M Scotchprint™ Electronic Image Transfer Media (8601) which was solvent coated with silicone urea release formulation, as described in U.S. Pat. No. 5,045,391.

Examples of Temporary Image Receptors for Electrophotographic Printing

The Comparative Examples of surface release layers for electrophotographic printing are shown in Series 1 in Tables 5 and 6. A scaled up version of Formulation 1 in WO96/343 18 was extrusion (lie coated onto a photoreceptor construction of inverted dual layer photoconductor as described in Example 2 of U.S. Pat. No. 5,733,698, and interlayer in Example 4 of U.S. patent application No. 08/724,073 and cured to give a crosslinked silicone polymer. High molecular weight vinyl silicones were coated out of heptane to give a smooth and defect free release coating was obtained, as indicated by the small roughness factor (Ra equal to 3.26 nm) in Table 6 and the visibly glossy surface.

The print quality of Comparative Example 1.1 was poor in a printer configuration without a drying roll, i.e., the print quality rating was greater than 2. Formulation 1.1, therefore, is only suited for a printing process with a drying roll. We also note that for an imaging process with a drying roll the print quality rating improves considerably when the beading of the liquid toner on the release is excluded from the analysis. However, since the drying roll is only applied after all four color planes are developed in a conventional SCE process, carrier liquid beading may be a problem in multicolor imaging on release surfaces such as those described in this comparative example. Any beading of the liquid toner prior to application of the drying roll may interfere with the generation of a laser scanned image (due to a lens effect).

Comparative Example 1.2 illustrates the use of another low swelling vinyl silicone used in combination with a high molecular weight gum. We note, however, that the print quality rating results in Comparative Example 1.2 are consistently poorer than those of Comparative Example 1.1.

In Comparative Example 1.3, we note that a 42% swelling silicone pre-polymer in combination with a high molecular weight silicone gum gives comparable print quality results to Comparative Example 1.2 without a drying roll. The print quality with a drying roll, however, is extremely poor, due to the offset of the toner image onto the drying roll.

As shown in Comparative Example 1.4, use of a high swelling (i.e. 99%) silicone gives improved print performance relative to moderately swelling silicone release formulation in Example 1.3 both with and without a dying roll and improved print performance relatively to the low swelling formulation of 1.2 without a drying roll.

Example 2 illustrates the use of a chemical additive to modify the coefficient of friction (C.O.F.) of a release surface. One additive that reduces the C.O.F. is a high molecular weight alkenyl functional gum. Examples 2.1, 2.3, 2.5, 2.7, 2.9, and 2.11 illustrate a homologous series of release formulations based on high swelling, hexenyl functional silicones. Examples 2.2, 2.4, 2.6, 2.8, 2.10, and 2.12 illustrate the addition of a high molecular weight, C.O.F. modifying silicone gum, as described in U.S. Pat. No. 5,468,815 and 5,520,978. These release surfaces have a more slippery feel, presumably due to the motion and flexibility of these long, unrestricted lengths of polydimethyl siloxane. The addition of gum lowers the C.O.F. without changing the peel force. The lower C.O.F. formulations give consistently improved printing performance both with and without the drying roll relative to the same formulation without the gum. Similar performance enhancements have been obtained with silicones of a higher crosslink density (i.e., lower swelling).

Example 3 illustrates the use of a silicate resin for improving the image transfer and print quality in an imaging process (i.e., with a drying roll) as described in U.S. Pat. No. 4,600,673; PCT Patent Publication No. WO96/34318; U.S. Pat. No. 5,733,698. Comparative Example 3.1 shows that the printing performance of the release surface without silicate resin is relatively poor both with and without a drying roll (unless beading is excluded from the analysis). The material set in Comparative Example 3.1 and Comparative Example 1.3 is identical except that the former was gravure coated from a 100% solids formulation. Both show very poor print quality with a drying roll due to image offset failure.

In contrast, as shown in 1Examples 3.3 and 3.4, increasing the silicate resin concentration from 25% to 37.5% (i.e., 50% to 75% Dow Corning 7615) improved the print quality significantly with a drying roll relative to Comparative Examples 3.1, 3.2 and 1.3. The improvements in print quality are accompanied with an additional advantageous improvement in release surface durability. While not wishing to be bound by any particular mechanism, we believe that the improvement in durability is related to a more tightly crosslinked or multimodal structure resulting in reduced swelling, as shown in Table 6. The silicate resin acts as a peel force modifier; the addition of silicate resin increases both the initial peel force and the peel force after extended wear (3200 wipes).

While not wishing to be bound by any particular mechanism, we believe that the improvement in print quality in the printing process is due to the increase in peel force of the release layer to a value which is high enough to prevent toner offset to the drying roll, yet low enough to enable release of the image to the transfer roll. Incorporation of silicate resin does not adversely affect the surface energy of the release.

We can distinguish the improvements in print quality and transfer due to silicate resin from the improvements caused by other chemical additives by the data in Table 6. The presence of silicate resin leads to a simultaneous increase in C.O.F., peel force and crosslinking density, while not changing the surface energy. This is distinguished from the mechanisms operative in Example 2 where the presence of a C.O.F. modifying additive decreases the C.O.F. while maintaining a constant, low peel force.

It will be understood by those skilled in the art that the improvements in print quality with silicate resin can be afforded by a variety of silicate resins and/or other resins that provide tightly crosslinked structures.

Example 4 illustrates the use of fillers in conjunction with other chemical release modifiers to generate a chemically-modified, roughened surface to enhance print quality both with and without a drying roll. As shown in Examples 4.1–4.6, the use of a small amount of hydrophobic fumed silica filler in a solvent coated release formulation increases the roughness of the coating without changing the surface energy; Ra values increase 20–100 times relative to an unfilled formulation. Roughening the release significantly improves the print quality both with and without a drying roll. Printing processes without drying roll are therefore enabled through the use of fillers. As shown in Example 4, the photoconducter release surface is critical to enabling a printing process without a drying roll. This result is consistent for release surfaces of varying crosslink density, as illustrated by Example 4.1–4.6 where % swelling ranges from 10–100%.

In addition to increasing roughness, the use of fumed silica in solvent coating results a concomitant decrease in C.O.F as shown in Examples 4.2, 4.4, and 4.6. While note wishing to be bound by any particular mechanism, the decrease in C.O.F. is due to the reduction of surface area available for contact, due to the elevation points of the filler. In contrast, when hydrophobic fumed silica is mixed into a solventless silicone as in Example 4.8, it disperses without agglomeration, therefore fewer contact points are seen, resulting in a visibly smoother surface, a lower Ra value and no reduction in C.O.F. Examples 2 and 4 therefore illustrate that the lowering the C.O.F. of the release surface consistently improves the print quality both with and without the drying roll. Reduction of C.O.F. may be accomplished either through the use of silicone gums or particulate fillers, The combination of gravure coated release texture and filler illustrated in Example 4.7 and 4.8 provide for a preferred print quality without a drying roll. The use of textured surfaces is further described in co-pending application U.S. Ser. No. 08/833,111. We note that Example 4 further illustrates that chemical modifiers and patterning processes can be combined to give enhanced printing performance both with and without a drying roll.

Examples of Temporary Image Receptors for Electrostatic Printing

The preparation and utility of textured temporary receptors for electrostatic imaging is examined in Tables 7, 8 and 9. Table 7 lists the raw materials and processes used in the solvent die coating of these release materials onto 3M™ Scotchprint™ Electronic Imaging Paper (8610).

Comparative Example 5 is the Scotchprint™ standard temporary image receptor (8601), which uses a solvent coated, silicone urea release formulation to give a smooth surface with no discernible pattern outside that imparted by the underlying substrate. Roughness of this standard release surface is 670 $\mu$m. In contrast, the solvent coated alkenyl functional silicone formulations in Example 6 gave a somewhat elevated Ra value (800–1200 $\mu$m), the highest increase of which was seen in the presence of 5 and 10% hydrophobic fumed silica (Examples 6.5 and 6.6, respectively).

As shown in Examples 6.1 to 6.7, significantly enhanced image transfer performance was found at 61 cm/min relative to the Comparative Example 5. Example 6.2 showed a lower transfer efficiency relative to Examples 6.1 and 6.3–6.7, reflecting the desirability of the C.O.F. modifying gum in the release formulations. Since standard product transfer is currently at 46 cm/min, this example demonstrates the potential of chemically modified release surfaces for improved transfer efficiency. No head scraping was observed under the conditions of the experiment. Furthermore, print quality was not degraded by the higher transfer rate. As shown by densitometry data in Table 9, the optical density of black, cyan, yellow and magenta toners were comparable to the control, with the exception of Example 6.3, which showed slightly lower density.

As shown in Table 8, none of these solvent coated chemically modified release formulations were capable of achieving acceptable image transfer at an elevated speeds of 183 cm/min under the conditions used in this experiment.

Example 6 illustrates that chemical additives, including C.O.F. modifying gums, particulate fillers and silicate resins can be used alone or in combination to give temporary receptors with improved transfer rates and good print quality for electrostatic imaging.

TABLE 5

Raw Materials and Processing Methods for Inventive Temporary Image Receptors for Electrophotography

| Example | Pre-polymer | Crosslinker | Additive 1 | Additive 2 | Coating Dispersion | Coating process |
|---|---|---|---|---|---|---|
| 1.1 | VI | United Chemicals NM203 | X | none | heptane | die coated |
| 1.2 | Gelest VDT-731 | Syl-Off ™ 7048 | IX | none | heptane | die coated |
| 1.3 | V | Syl-Off ™ 7048 | IX | none | heptane | die coated |
| 1.4 | I | Syl-Off ™ 7488 | IX | none | heptane | die coated |
| 2.1 | II | Syl-Off ™ 7488 | none | none | heptane | die coated |
| 2.2 | II | Syl-Off ™ 7488 | IX | none | heptane | die coated |
| 2.3 | II | Syl-Off ™ 7488 | none | none | heptane | die coated |
| 2.4 | III | Syl-Off ™ 7488 | IX | none | heptane | die coated |
| 2.5 | III | Syl-Off ™ 7488 | none | none | heptane | die coated |
| 2.6 | IV | Syl-Off ™ 7488 | IX | none | heptane | die coated |
| 2.7 | V | Syl-Off ™ 7678 | none | none | heptane | die coated |
| 2.8 | V | Syl-Off ™ 7678 | IX | none | heptane | die coated |
| 2.9 | V | Syl-Off ™ 7048 | none | none | heptane | die coated |
| 2.10 | V | Syl-Off ™ 7048 | IX | none | heptane | die coated |
| 2.11 | V | Syl-Off ™ 7488 | none | none | heptane | die coated |
| 2.12 | V | Syl-Off ™ 7488 | IX | none | heptane | die coated |
| 3.1 | V | Syl-Off ™ 7048 | IX | none | 100% solids | gravure |
| 3.2 | V | Syl-Off ™ 7048 | IX | 25% Dow Corning 7615 | 100% solids | gravure |
| 3.3 | V | Syl-Off ™ 7048 | IX | 50% Dow Corning 7615 | 100% | gravure |
| 3.4 | V | Syl-Off ™ 7048 | IX | 75% Dow Corning 7615 | 100% solids | |
| 4.1 | Gelest VDT-73 1 | Syl-Off ™ 7048 | IX | none | heptane | die coated |
| 4.2 | Gelest VDT-73 1 | Syl-Off ™ 7048 | IX | 1% Cab-O-Sil ™ TS720 | heptane | die coated |
| 4.3 | V | Syl-Off ™ 7048 | IX | none | heptane | die coated |
| 4.4 | V | Syl-Off ™ 7048 | IX | 1% Cab-O-Sil ™ TS720 | heptane | die coated |
| 4.5 | V | Syl-Off ™ 7048 (1.34:1 silyl hydrid:vinyl) TM | IX | none | heptane | die coated |
| 4.6 | V | Syl-Off ™ 7048 (1.34:1 silyl hydrid:vinyl) | IX | 1% Cab-O-Sil ™ TS720 | heptane | die coated |
| 4.7 | V | Syl-Off ™ 7048 | IX | none | 100% solids | gravure |
| 4.8 | V | Syl-Off ™ 7048 | IX | 1% Cab-O-Sil ™ TS720 | 100% solids | gravure |

TABLE 6

Examples of Temporary - Image Receptors for Electrophotographic Printing

| | | | | | Peel force (grams/cm at 0 or 3200 wipes) | | Surface Energy (mN/m) | | | Roughness | Print Quality (rating scale: 1.0 is excellent and 5.0 is poor; (see also description in Methods) | | | |
|---|---|---|---|---|---|---|---|---|---|---|---|---|---|---|
| | | | | | | | | | | | Without Drying Roll | | With Drying Roll | |
| Example | % Additive | % Swelling | Durability (g) | C.O.F. | 0 | 3200 | Total | Disperse | Polar | Ra (nm) | no beading | beading | no beading | beading |
| 1.1 | gum | 18% | 300 | 0.800 | 3.9 | 21 | 23.0 | 23.0 | 0.0 | 3.26 | 2.50 | 2.14 | 1.83 | 1.44 |
| 1.2 | gum | 11% | 200 | 1.10 | 2.6 | 6.5 | 22.2 | 22.2 | 0.0 | 2.15 | 2.75 | 2.43 | 2.00 | 1.63 |
| 1.3 | gum | 42% | 100 | 0.667 | 1.1 | 6.8 | NA | NA | NA | 6.21 | 2.75 | 2.43 | 4.50 | 4.00 |
| 1.4 | gum | 169% | NA | 1.80 | 0.31 | NA | NA | NA | NA | NA | 2.62 | 2.29 | 2.25 | 1.86 |

TABLE 6-continued

Examples of Temporary - Image Receptors for Electrophotographic Printing

| Example | % Additive | % Swelling | Durability (g) | C.O.F. | Peel force (grams/cm at 0 or 3200 wipes) 0 | Peel force (grams/cm at 0 or 3200 wipes) 3200 | Surface Energy (mN/m) Total | Surface Energy (mN/m) Disperse | Surface Energy (mN/m) Polar | Roughness Ra (nm) | Print Quality (rating scale: 1.0 is excellent and 5.0 is poor; (see also description in Methods) Without Drying Roll beading | Without Drying Roll no beading | With Drying Roll beading | With Drying Roll no beading |
|---|---|---|---|---|---|---|---|---|---|---|---|---|---|---|
| 2.1 | none | 167% | NA | 1.55 | 0.59 | NA | NA | NA | NA | NA | 1.75 | 1.86 | 1.78 | 1.88 |
| 2.2 | gum | 167% | NA | 1.31 | 0.63 | NA | NA | NA | NA | NA | 1.69 | 1.64 | 1.67 | 1.63 |
| 2.3 | none | 98% | NA | 1.61 | 0.59 | NA | NA | NA | NA | NA | 3.13 | 2.86 | 2.28 | 1.94 |
| 2.4 | gum | 98% | NA | 1.33 | 0.79 | NA | NA | NA | NA | NA | 1.62 | 1.43 | 1.62 | 1.43 |
| 2.5 | none | 114% | NA | 1.71 | 0.75 | NA | NA | NA | NA | NA | 3.38 | 3.14 | 2.56 | 2.25 |
| 2.6 | gum | 114% | NA | 1.03 | 1.1 | NA | NA | NA | NA | NA | 1.81 | 1.79 | 1.78 | 1.75 |
| 2.7 | none | 114% | NA | 1.68 | 1.2 | NA | NA | NA | NA | NA | 2.50 | 2.43 | 2.00 | 1.88 |
| 2.8 | gum | 114% | NA | 0.748 | 1.4 | NA | NA | NA | NA | NA | 1.69 | 1.64 | 1.56 | 1.50 |
| 2.9 | none | 114% | NA | 1.60 | 0.79 | NA | NA | NA | NA | NA | 2.12 | 1.71 | 2.00 | 1.57 |
| 2.10 | gum | 114% | NA | 0.886 | 1.2 | NA | NA | NA | NA | NA | 1.94 | 1.79 | 1.83 | 1.69 |
| 2.11 | none | 114% | NA | 1.68 | 1.6 | NA | NA | NA | NA | NA | 3.13 | 2.86 | 2.44 | 2.13 |
| 2.12 | gum | 114% | NA | 0.757 | 1.3 | NA | NA | NA | NA | NA | 2.38 | 2.29 | 1.78 | 1.63 |
| 3.1 | 0% | 41% | 500 | 0.719 | 1.5 | 6.0 | 22.2 | 22.2 | 0.1 | 56.65 | 2.13 | 1.86 | 4.5 | 5.00 |
| 3.2 | 12.5% silicate | 29% | 500 | 1.20 | 2.0 | 4.9 | 22.7 | 22.3 | 0.4 | 16.46 | 2.62 | 2.29 | 5.00 | 5.00 |
| 3.3 | 25% silicate | 22% | 400 | 1.30 | 4.8 | 11 | 22.3 | 22.3 | 0 | 16.46 | 2.19 | 2.07 | 1.83 | 1.69 |
| 3.4 | 37.5% silicate | 20% | 700 | 1.35 | 1.0 | 26 | 22.6 | 22.6 | 0 | 13.27 | 2.19 | 2.21 | 1.56 | 1.50 |
| 4.1 | 0% | 11% | 200 | 1.10 | 2.6 | 6.5 | 22.2 | 22.2 | 0.0 | 2.15 | 1.75 | 2.43 | 2.00 | 1.63 |
| 4.2 | 1% | 11% | 200 | 0.781 | 2.2 | 4.4 | 22.1 | 22.0 | 0.1 | 205.59 | 1.69 | 1.79 | 1.44 | 1.50 |
| 4.3 | 0% | 42% | 100 | 0.667 | 1.1 | 6.8 | NA | NA | NA | 6.21 | 2.75 | 2.43 | 4.50 | 4.00 |
| 4.4 | 1% | 43% | 50 | 0.428 | 1.1 | 9.8 | 22.2 | 22.2 | 0.0 | 117.39 | 1.69 | 1.79 | 1.56 | 1.63 |
| 4.5 | 0% | 114% | NA | 0.757 | 1.3 | NA | NA | NA | NA | | 2.38 | 2.28 | 1.73 | 1.62 |
| 4.6 | 1% | 114% | NA | 0.624 | 1.1 | NA | NA | NA | NA | | 1.50 | 1.57 | 1.33 | 1.38 |
| 4.7 | 0% | 41% | 500 | 0.719 | 1.5 | 6.0 | 22.2 | 22.2 | 0.1 | 56.65 | 2.13 | 1.86 | 4.5 | 5.00 |
| 4.8 | 3% | 37% | 300 | 0.757 | 1.1 | 6.3 | 22.9 | 22.8 | 0.1 | 86.00 | 1.57 | 1.57 | 3.25 | 5.00 |

TABLE 7

Raw Materials for Temporary Image Receptors for Electrostatic Imaging

| Example | Base polymer | Crosslinker | Gum | Additive 1 | Dispersion | Coating process |
|---|---|---|---|---|---|---|
| 5 | Scotchprint standard 860 1 (AS033011) | | | | | |
| 6.1 | VII | Syl-Off ™ 7048 | XI | 3% HMDZ in-situ treated silica | heptane | die coated |
| 6.2 | VIII | Syl-Off ™ 7048 | none | none | heptane | die coated |
| 6.3 | VIII | Syl-Off ™ 7048 | XI | none | heptane | die coated |
| 6.4 | Dow Corning 7615 silicate resin | Syl-Off ™ 7048 | Gelest DMS-V41 | none | heptane | die coated |
| 6.5 | Dow Corning 7615 silicate resin | Syl-Off ™ 7048 | Gelest DMS-V41 | 5% Cab-O-Sil ™ TS720 | heptane | die coated |
| 6.6 | Dow Corning 7615 silicate resin | Syl-Off ™ 7048 | Gelest DMS-V41 | 10% Cab-O-Sil ™ TS720 | heptane | die coated |
| 6.7 | Dow Corning 7615 silicate resin | Syl-Off ™ 7048 | Gelest DMS-V52 | none | heptane | die coated |

TABLE 8

Performance of Chemically Modified Temporary Image Receptors for Electrostatic Imaging

| Example | Roughness, Ra (nm) | Image Transfer Rating | |
|---|---|---|---|
| | | 61 cm/min | 183 cm/min |
| 5 | 670.1 | 7.5 | 4.0 |
| 6.1 | 996.3 | 9.0 | 4.5 |
| 6.2 | 964.1 | 8.0 | 4.0 |
| 6.3 | 921.2 | 9.2 | 3.0 |
| 6.4 | 1050 | 9.4 | 3.0 |
| 6.5 | 1140 | 9.5 | 3.0 |
| 6.6 | 959.5 | 9.5 | 3.5 |
| 6.7 | 858.7 | 9.5 | 4.0 |

TABLE 9

Performance of Temporary Image Receptors for Electrostatic Printing

| Example | Optical Density | | | |
|---|---|---|---|---|
| | Black | Cyan | Yellow | Magenta |
| 5 (8610) | 1.42 | 1.18 | 0.84 | 1.18 |
| 6.1 | 1.39 | 1.19 | 0.91 | 1.17 |
| 6.2 | 1.37 | 1.21 | 0.86 | 1.2 |
| 6.3 | 1.04 | 0.84 | 0.80 | 1.03 |
| 6.4 | 1.34 | 1.14 | 0.88 | 1.09 |
| 6.5 | 1.35 | 1.2 | 0.84 | 1.18 |
| 6.6 | 1.37 | 1.19 | 0.83 | 1.17 |
| 6.7 | 1.38 | 1.19 | 0.83 | 1.2 |

The invention is not limited to the above embodiments. The claims follow.

What is claimed is:

1. An electrostatic image receptor comprising a dielectric substrate;

a release layer comprising the reaction product of 35 to 80 parts by weight of a base material having the formula $(R_3SiO_{1/2})_2(R_2SiO_{2/2})_x$, wherein each R is independently selected from alkyl groups, aryl groups, and functional groups capable of crosslinking, and at least 3% of R are functional groups capable of crosslinking, and x is an integer greater than 0;

more than 0 up to 50 parts by weight of a second material having the formula $(R'_3SiO_{1/2})_2(R'_2SiO_{2/2})_y$, wherein each R' is independently selected from alkyl groups, aryl groups, and functional groups capable of crosslinking, and no more than 2.5% of R' are functional groups capable of crosslinking, and y is an integer of at least 50;

more than 0 up to 160 parts by weight of a third material having the formula $(R''_3SiO_{1/2})_a(R''_2SiO_{2/2})_c(R''_nSiO_{(4-n)/2})_b$ wherein a, b, and c are integers, a is 3 or greater, b is 5 or greater, c is 0 or greater and $0.25<b/(a+b+c)<0.9$; n=0 or 1; and each R'' is independently selected from alkyl groups, aryl groups, and functional groups capable of crosslinking; and optionally, 5 to 30 parts by weight of a crosslinking agent having the formula $(R'''_3SiO_{1/2})_2X(R'''_2SiO_{2/2})_z$, wherein z is an integer from 0 to 100; X is a single bond, O or a divalent organic linking group; each R''' is independently selected from alkyl groups, aryl groups, and functional groups capable of crosslinking and 25–100% of R''' are functional groups capable of crosslinking provided that there are at least 2 functional groups capable of crosslinking per molecule.

2. The receptor of claim 1, further comprising a toner image on the release layer.

3. The receptor of claim 1, wherein the dielectric substrate is a paper.

4. The receptor of claim 1, wherein the dielectric substrate is a film.

5. The receptor of claim 2, wherein the toner image is releasable from the receptor.

6. The receptor of claim 5, wherein the toner image is releasable with the release layer from the dielectric substrate.

7. The receptor of claim 1, wherein the release layer is textured.

* * * * *